July 3, 1951 L. W. JACKSON 2,559,123
SAFETY CAR STEP
Filed Nov. 18, 1949

INVENTOR.
Lloyd W. Jackson.
BY W. B. Harpman
ATTORNEY.

Patented July 3, 1951

2,559,123

UNITED STATES PATENT OFFICE 2,559,123

SAFETY CAR STEP

Lloyd W. Jackson, Hubbard, Ohio, assignor of fifty per cent to Joseph R. Heaps, Hubbard, Ohio Application November 18, 1949, Serial No. 128,107

3 Claims. (Cl. 280—164)

This invention relates to a safety step for motor vehicles and more particularly to a safety step attachable to a motor vehicle frame so as to extend outwardly beneath a door of a motor vehicle.

The principal object of the invention is the provision of a safety step attachable to a motor vehicle.

A still further object of the invention is the provision of a safety step for attachment to the frame of a motor vehicle so as to extend beneath a door thereof.

A still further object of the invention is the provision of a safety step of simple and inexpensive construction and universally attachable to various motor vehicles.

A still further object of the invention is the provision of a safety step which may be attached to a motor vehicle and adjusted to desired position beneath a door thereof.

The safety step shown and described herein comprises a simple and inexpensive accessory which may be easily attached to a motor vehicle at the sides thereof and to the frame thereof so that the step portion of the device is positioned in desired relation to an access door of the motor vehicle.

It is well known that current automobile construction practice is to eliminate steps, running boards or the like from the construction making it necessary for persons entering or leaving the motor vehicle to step from the ground directly into the motor vehicle or therefrom. The floor height of the various motor vehicles is such that it is frequently difficult for persons to enter or leave the vehicle, and, additionally, there is no means provided in the motor vehicle against which snow, ice, mud or other debris may be scraped and removed from the person's shoes. The principal object of the invention is, therefore, to provide a safety step which is conveniently located, will bear the person's weight safely, and will also provide a device against which the shoes may be scraped before entering the motor vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
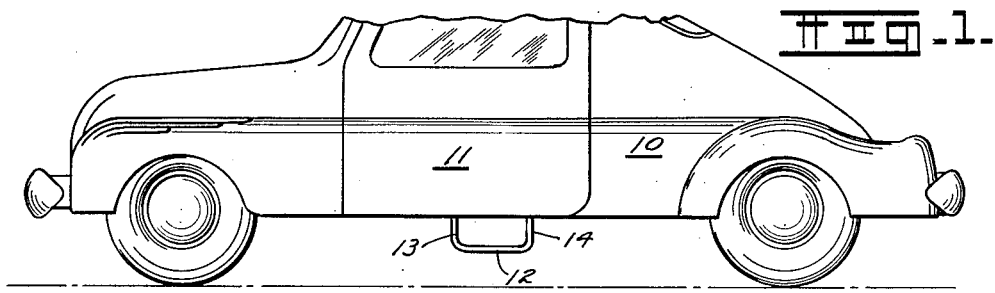
Figure 1 is a side view of a portion of a motor vehicle showing the step in position under a door thereof.
Figure 2:
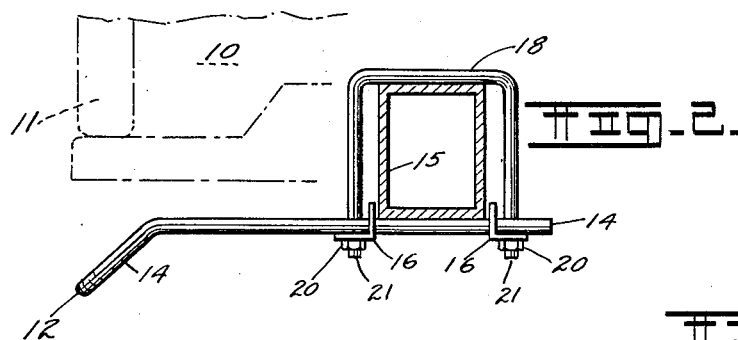
Figure 2 is a side view of the step showing it installed on the motor vehicle frame and beneath a door thereof.

The safety step shown and described herein comprises a semi-U shaped body member, the base or transverse portion thereof being positioned at an angle with respect to the arms thereof and as illustrated in Figure 1 a motor vehicle 10 having an access door 11 is provided with a safety step 12, the step portion comprising the transverse or base portion of a semi-U shape, the arms of which are indicated by the numerals 13 and 14. The arms 13 and 14 extend upwardly on an angle as best shown in Figure 2 of the drawings and then inwardly beneath the motor vehicle and beneath the frame 15 thereof. A pair of angle irons 16—16 are positioned below and at either side of the frame 15. The arms 13 and 14 of the step 12 extend through apertures or notches 17 in the angle irons 16—16.

Figures 3, 4:
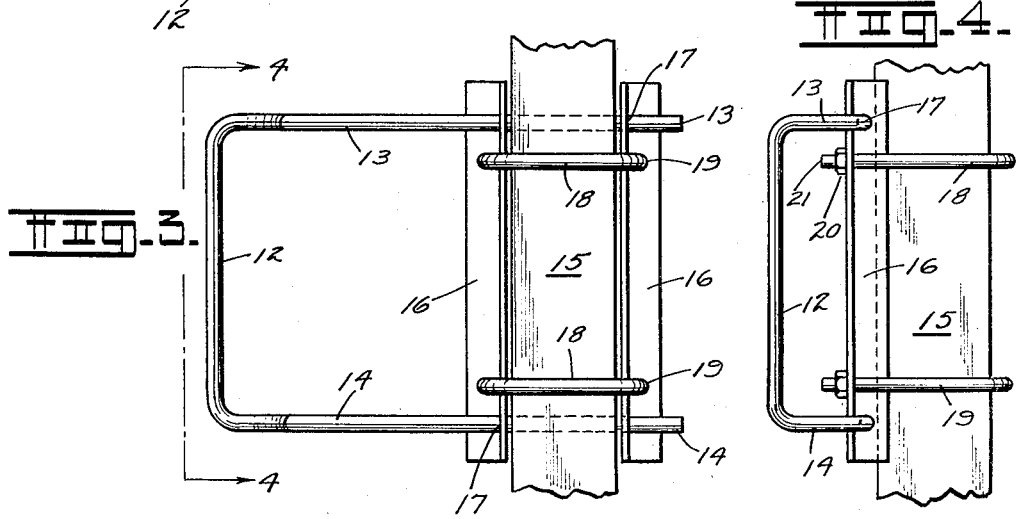
Figure 3 is a top view of the step and a portion of the motor vehicle frame to which it is attached.
Figure 4 is an end view taken on line 4—4 of Figure 3.

A pair of inverted U-shaped clamps 18—18 are positioned over the frame 15 and secured at their lower ends to the angle irons 16—16 as by being passed through apertures 19—19 therein and provided with nuts 20 engaging threaded end portions 21 so that the device encircles the frame 15 and may be clamped tightly thereto as shown in Figures 2, 3 and 4 of the drawings.

It will be observed that the location of the frame 15 with respect to the door 11 of the motor vehicle 10 is immaterial as the length of the semi-U shaped step 12, and particularly the arms 13 and 14, enable the same to be moved transversely of the motor vehicle to the desired location. The inverted U-shaped clamps 18 are also of sufficient length to encircle any height or width of any automobile frame ordinarily found.

The top view in Figure 3 of the drawings clearly shows the relation of the frame 15 to the device and the interlocking engagement of the angle irons 16—16 with the arms 13 and 14 of the step 12 and the positioning of the clamps 18—18 over the frame 15 and their engagement with the irons 16—16 thereby forming a unitary structure securely affixed to the frame 15 of the motor vehicle.

Figure 5:
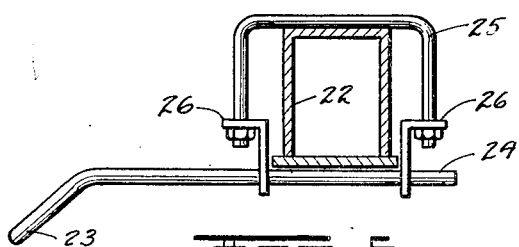
Figure 5 is a side view of a modified form of step and particularly with respect to the attachment means therefor.

Modifications of the device and particularly the manner of attaching the same to the frame of the motor vehicle are obviously possible and one such modification is shown in Figure 5 of the drawings wherein the frame of the vehicle is indicated by the numeral 22 and the step by the numeral 23 and including arms 24 extending in under the frame 22. U-shaped clamping members 25 are positioned over the frame 22 and engage individual brackets 26—26 which in turn are engaged on the spaced arms 24 of the step 23. This form of attachment eliminates the angle irons 16—16 as such and substitutes in their place a plurality of apertured L-shaped brackets 26, the device being attachable to the motor vehicle and usable in exactly the same manner as the step described in connection with Figures 1 through 4 of the drawings.

It will thus be seen that a simple and efficient safety step for a motor vehicle has been disclosed which may be attached to the frame of the vehicle at any desired position and beneath one or more of the doors, if desired, and which will form a convenient step and also means for scraping snow, ice and debris from the shoes of the person entering the motor vehicle.

It will thus be seen that the invention as herein disclosed meets the several objects.

Having thus described my invention, what I claim is:

1. The combination of a motor vehicle having a frame structure and an access door and a safety step positioned beneath said door, said safety step comprising a substantially U-shaped body member positioned transversely of said motor vehicle with the interconnecting portion of the substantially U-shaped body member lying beneath the said door and parallel with the bottom thereof, and clamps securing the arms of the said substantially U-shaped member to the said structural frame of the said vehicle, the said clamps comprising a pair of inverted U-shaped clamping members positioned about the said structural portion of the vehicle and apertured angle irons positioned beneath the said structural portions of the vehicle, the arms of the said substantially U-shaped body member being passed through the apertures in the said angle iron, and fasteners securing the assembly together.

2. The combination of a motor vehicle having a frame structure and an access door and a safety step positioned beneath said door, said safety step comprising a U-shaped body member positioned transversely of said motor vehicle with the interconnecting portion of the U-shaped body member lying beneath the said door and parallel with the bottom thereof and clamps securing the arms of the said U-shaped member to the said structural frame of the said vehicle, the said clamps comprising a pair of inverted U bolts positioned about the said structural portion of the vehicle and apertured angle irons engaged upon the said arms of the U-shaped step portion and fasteners urging the angle irons and the U bolts together so as to clamp the U-shaped body member to the said structural portion.

3. The combination of a motor vehicle having a frame structure and an access door and a safety step positioned beneath said door, said safety step comprising a U-shaped body member positioned transversely of said motor vehicle with the interconnecting portion of the U-shaped body member lying beneath the said door and in spaced parallel relation with the bottom thereof, and clamps securing the arms of the said U-shaped member to the said structural frame of the said vehicle, said clamps comprising inverted U bolts positioned over the said structural portion of the vehicle and apertured brackets secured thereto and engaged upon the arms of the said step portion.

LLOYD W. JACKSON.

REFERENCES CITED

The following references are of record in the file of this patent:

UNITED STATES PATENTS

| Number | Name | Date |
|---|---|---|
| 83,305 | Panchot | Oct. 20, 1868 |
| 497,598 | Palmer | May 16, 1893 |
| 1,017,096 | Harris et al. | Feb. 13, 1912 |
| 1,215,721 | Schuyler | Feb. 13, 1917 |
| 2,037,805 | Lindstedt | Apr. 21, 1936 |
| 2,457,380 | Kelberer | Dec. 28, 1948 |